UNITED STATES PATENT OFFICE.

HARRY HAMLIN, OF BUFFALO, NEW YORK.

ART OF MANUFACTURING STARCH.

SPECIFICATION forming part of Letters Patent No. 253,923, dated February 21, 1882.

Application filed January 5, 1882. (No specimens.)

*To all whom it may concern:*

Be it known that I, HARRY HAMLIN, of Buffalo, in the county of Erie and State of New York, have made an invention of certain new and useful Improvements in the Art of Manufacturing Starch; and I do hereby declare that the following is a full, clear, and exact description and specification of the same.

Heretofore starch has been manufactured from the ground crude material by two distinct processes. According to both of these processes the crude material is ground, and this starch is washed from it by the action of water, a separator, having a separating-sieve of some kind, being used to separate the husks of the grain from the starch-water, which is usually sour or acid. According to one of said processes, commonly called the "acid" or "sour-starch" process, the starch is separated directly from the sour-starch water by subsidence, which is sometimes effected in tanks and sometimes upon starch-planes, the liquid being allowed to run to waste as refuse, after which the starch is generally washed. According to the other process, which is commonly called the "sweet" or "sweet-starch" process, the starch in the starch-water from the separator has more or less of the water removed from it by subsidence, and is treated with a caustic alkali for the purpose of facilitating the removal of the glutinous matter of the crude starch material, after which treatment the starch is separated from the alkaline liquid by subsidence, which may be effected either in tanks or upon a starch-plane, the starch being subsequently washed, if necessary. The first of said processes is attended with the disadvantage that the starch is not freed from glutinous matter previous to its ultimate separation from the acid water by subsidence, and consequently a material quantity of starch is generally carried off with the refuse liquid from which the starch is separated. The second of said processes is not subject to the above objection, but is attended with the disadvantage that a large quantity of caustic alkali is required to treat the whole of the starch material obtained by the use of the separator.

The object of the present invention is to obviate the disadvantages of the said two processes; and it consists of a process of treating the starch-water obtained by the separator in such manner that the greater part of the starch may be obtained directly from the starch-water by subsidence, while the residue is obtained by alkaline treatment.

In order that my said process may be fully understood, I will proceed to describe the mode in which I have practiced it with success; and in doing this I have made use of the usual apparatuses of starch-factories, consisting of grinding-mills, sieve-separators, tanks or vats, and starch-planes, as well as of the pipes, troughs, and pumps which are used in starch-factories to convey the material from one part or apparatus of a factory to another. As all such apparatuses are well understood by starch manufacturers, no particular description of them is necessary.

After the grain has been steeped as usual and ground with water, the mass is subjected to the action of the sieve separator, by which the somewhat sour mixture of starch and water commonly called "starch-water" is separated from the husks or coarse matter of the grain. The starch-water is then conducted to the head of a starch-plane, and is permitted to run down the same at such speed (regulated by the inclination to which the starch-plane is adjusted, or by the quantity of material supplied thereto) that starch will deposit upon the plane practically free of glutinous matter, while practically all the glutinous matter, with a considerable portion of starch, which is entangled with it, flows off with the liquid, escaping at the foot of the starch-plane in the condition of what I term "runnings." As the object of this first deposit by subsidence on the starch-plane is not to separate the whole of the starch, but only the large portion thereof which is practically disentangled from glutinous matter, the operation may be conducted much more rapidly than is customary upon planes of the usual inclination by feeding the starch-water more rapidly at the head of the plane. The portion of starch thus separated by subsidence is practically finished; but, if deemed expedient, it may be washed in any of the usual modes after it is removed from the starch-plane. The partially-liquid matter or runnings escaping at the foot of the starch-plane are conducted into tanks or vats, in which the solid matter is permitted to separate from the liquid by subsidence, after which the whole or the greater part of the liquid is allowed to run off as water. The matter thus concentrated from the runnings is treated with caustic alkali. For this purpose the concentrated matter from several depositing or settling tanks (after being stirred up either with or without the addition of water, as found necessary, to cause it to run through pipes or troughs) is conducted into one large mixing-tank, wherein the mass may be readily reduced, if necessary, by the addition of water to the consistency or density which it is deemed best the matter should have when the alkali is added to it. A measured quantity of the caustic alkali in solution in water is then run into the tank, and the mixture is subjected to agitation, so as to subject all the glutinous matter to the action of the alkali. As the quantity of material to be treated is much smaller than the whole of the starch matter of the grain, a much less quantity of alkali is required in proportion to the total quantity of starch contained in a given weight of grain than has previously been used. After the concentrated matter has been treated with the alkali it is conducted to a starch-plane of the usual inclination, and the starch is permitted to subside thereon, while the liquid runs off at the foot of the plane as waste. The portion of starch deposited upon the plane from the alkali-treated runnings may be washed (in the ordinary manner of washing starch) or not, as deemed expedient, and may or may not be mixed with the portion of starch deposited upon the plane without previous alkaline treatment, as may be deemed expedient.

From the foregoing description it will be perceived that a characteristic feature of my invention is the division of the starch matter of the starch-water (received from the separator) into two parts or portions by the operation of partial subsidence, one of which portions consists of the starch separated directly by subsidence without a preliminary alkaline treatment, while the other portion (which contains practically all the glutinous matter of the grain) is subjected to alkaline treatment previous to the separation of the residual starch by subsidence.

The practical result of the process is a more perfect separation of the starch from glutinous matter than is effected by the sour process, and the practical elimination of the glutinous matter from the starch by the use of a much less quantity of alkali than is required by the well-known sweet-starch process.

I have found by practice that the treatment of the runnings from the starch-water obtained from one hundred bushels of corn can be effected satisfactorily with about thirty pounds of commercial caustic soda containing seventy per cent. of pure alkali, and that a satisfactory action of the alkali upon the glutinous matter is effected when the mixture of concentrated runnings and alkali is of a density of 8° Baumé, and the matter is agitated in the tank in which it is treated with the alkali for one hour before being conducted to the starch-plane. The quantity of alkali used, the greater or less concentration of the runnings, and the time of treatment with the alkali may, however, be varied, as found expedient, according to the quality of the grain and other circumstances which occur in practice.

The apparatuses used may also be varied as found expedient, as the direct separation of the starch by subsidence may be effected in tanks or vats, and the concentration of the runnings may be effected by the use of a starch table or plane. It is also not essential to the said process that the runnings should be concentrated before being subjected to the alkaline treatment, as the alkali may be applied directly to the runnings, and may be applied in the settling tanks or vats; but I prefer to concentrate the starch matter of the runnings previous to subjecting it to the action of the alkali, (because this course, in my opinion, reduces the quantity of alkali required,) and to apply the alkali in the mixing-tank.

The sub-process of treating the starch material with alkali by conducting the settlings from several settling-tanks into one mixing tank or vat in which the alkali is applied is of material advantage in determining the quantity of alkali to be used, because the consistency or density of the settlings varies in different tanks, and the mixture of them in a single tank not only averages the consistency of the mass, but enables a large quantity of starch material to be readily reduced by the addition of water to the desired density for the treatment by the alkali, and also enables the required quantity of alkali for a single operation to be readily ascertained, because when the mass is reduced to a specific consistency or density (as measured by a hydrometer) the depth of the mass in the mixing-tank is the measure of the quantity of starch material contained in it, and enables the operator to determine and supply the correspondingly-measured quantity of solution of the caustic alkali of a specific or standard density, which is sufficient to free the starch from the glutinous matter.

I claim as my invention—

1. The process, substantially as before set forth, of separating starch from starch-water, consisting of the separation of a portion of the starch directly from the starch-water by subsidence, the treatment of the residuary starch matter with caustic alkali, and the separation of the remaining portion of starch by subsidence.

2. The process of subjecting starch matter to the action of alkali, consisting in conducting the settlings from several settling-tanks into one mixing-tank, in which the alkali is applied, and in which the collected settlings may be simultaneously reduced to the desired consistency.

Witness my hand this 31st day of December, A. D. 1881.

HARRY HAMLIN.

Witnesses:
C. D. ELLIS,
WM. H. THORNTON.